United States Patent
Zhang et al.

(10) Patent No.: US 7,296,109 B1
(45) Date of Patent: Nov. 13, 2007

(54) BUFFER BYPASS CIRCUIT FOR REDUCING LATENCY IN INFORMATION TRANSFERS TO A BUS

(75) Inventors: Hui Zhang, San Jose, CA (US); Daniel Steinberg, Mountain View, CA (US); Qi Bian, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 266 days.

(21) Appl. No.: 10/767,001

(22) Filed: Jan. 29, 2004

(51) Int. Cl.
*G06F 13/36* (2006.01)
(52) U.S. Cl. .............. 710/310; 710/309; 710/313; 370/229
(58) Field of Classification Search ........... 710/113, 710/305, 52, 110, 240, 309, 310, 313; 711/122, 711/133, 154; 370/452; 713/600
See application file for complete search history.

(56) References Cited

U.S. PATENT DOCUMENTS

| | | | | |
|---|---|---|---|---|
| 5,450,547 A * | 9/1995 | Nguyen et al. | ............. | 713/600 |
| 5,526,508 A * | 6/1996 | Park et al. | ............. | 711/122 |
| 5,581,782 A | 12/1996 | Sarangdhar et al. | ........ | 395/800 |
| 5,712,991 A * | 1/1998 | Wichman et al. | ............. | 710/52 |
| 5,758,166 A * | 5/1998 | Ajanovic | ............. | 710/240 |
| 5,768,622 A | 6/1998 | Lory et al. | ............. | 395/855 |
| 5,845,096 A | 12/1998 | Munguia et al. | ............. | 395/293 |
| 5,860,102 A * | 1/1999 | Middleton | ............. | 711/133 |
| 5,896,384 A * | 4/1999 | Erickson | ............. | 370/452 |
| 5,931,932 A * | 8/1999 | Kanekal | ............. | 710/113 |
| 5,978,878 A * | 11/1999 | Lange | ............. | 710/310 |
| 5,987,549 A | 11/1999 | Hagersten et al. | ........ | 710/107 |
| 6,073,199 A * | 6/2000 | Cohen et al. | ............. | 710/113 |
| 6,128,711 A | 10/2000 | Duncan et al. | ............. | 711/155 |
| 6,173,349 B1 * | 1/2001 | Qureshi et al. | ............. | 710/110 |
| 6,247,089 B1 * | 6/2001 | Kuo et al. | ............. | 710/309 |
| 6,415,348 B1 | 7/2002 | Mergard et al. | ............. | 710/305 |
| 6,542,949 B1 | 4/2003 | Kruse | ............. | 710/113 |
| 6,708,257 B2 * | 3/2004 | Bao | ............. | 711/154 |
| 7,096,307 B2 * | 8/2006 | Moyer | ............. | 710/313 |
| 2004/0003160 A1 * | 1/2004 | Lee et al. | ............. | 710/305 |

FOREIGN PATENT DOCUMENTS

JP  11-031066  *  2/1999

* cited by examiner

*Primary Examiner*—Christopher E. Lee
(74) *Attorney, Agent, or Firm*—Kenneth Glass; Victor Okumoto

(57) ABSTRACT

A buffer bypass circuit for reducing latency in information transfers to a bus is described. Access to the bus is governed by a bus arbiter employing a bus parking scheme. The buffer bypass circuit comprises a multiplexer and logic configured such that the information to be transferred is either buffered in a buffer if a grant generated by the bus arbiter indicates that the bus is unavailable, or transferred directly to the bus if the grant indicates that the bus is available and the buffer is empty at the time.

24 Claims, 8 Drawing Sheets

BUFFER BYPASS CIRCUIT FOR REDUCING LATENCY IN INFORMATION TRANSFERS TO A BUS

FIELD OF THE INVENTION

The present invention generally relates to computer system buses and in particular, to a buffer bypass circuit for reducing latency in information transfers to a bus.

BACKGROUND OF THE INVENTION

Latency is time spent in an information transfer that is for activities other than the actual transferring of the information. Examples of latency in information transfers to a bus include time spent in requesting access to the bus, receiving and recognizing a grant to access the bus, and setting up the information transfer to the bus. The reduction of latency in information transfers to a bus is useful, because latency reduction generally provides improved system performance through more efficient bus utilization.

Pre-requests and bus parking are two techniques used to avoid latency associated with the process of requesting and being granted access to a bus. Using a pre-quest, access to the bus is requested and granted before, rather than after, a current operation ends so that a next operation may occur without a request/grant delay. Using bus parking, a grant to access a bus is automatically given to a bus master (such as a central processing unit) whenever the bus is idle (i.e., the bus is not currently being used and there is no pending request to access the bus), so the bus master doesn't have to perform a grant/request procedure as long as the grant is active.

Buffers are also commonly used so that a device doesn't have to wait on a busy or otherwise unavailable bus before transferring data. Instead, the device transfers data to the buffer and consequently, is free to perform other tasks. When the bus is subsequently available, logic associated with the buffer manages the transfer of data from the buffer to the bus in a manner transparent to the device. The use of buffers in this fashion is especially useful when the device transferring information to the bus is a central processing unit.

Although each of these techniques, individually and/or in combination with one another, substantially reduce latency in information transfers to a bus, additional improvements are generally desirable whenever possible to further improve system performance through improved bus utilization.

OBJECTS AND SUMMARY OF THE INVENTION

The present invention is based upon the observation that latency in information transfers to a bus may be reduced under certain circumstances as described herein by passing a buffer normally used to buffer such information transfers when the bus is not immediately available.

Accordingly, it is an object of the present invention to provide a method for bypassing a buffer for reducing latency in information transfers to a bus.

Another object is to provide a buffer bypass circuit for reducing latency in information transfers to a bus that complements other latency reducing circuitry when present.

These and additional objects are accomplished by the various aspects of the present invention, wherein briefly stated, one aspect is a method for reducing latency in information transfers to a bus, comprising: receiving an indication that information is to be transferred to a bus; reading a bus grant indication; writing the information to a buffer if the bus grant indication does not indicate that transfer of the information to the bus is allowed; and transferring the information to the bus if the buffer is empty and the bus grant indication indicates that transfer of the information to the bus is allowed.

Another aspect is a bus interface unit for reducing latency in information transfers from a device to a bus. The bus interface unit comprises a buffer having inputs coupled to the device; and logic configured to receive an indication from the device that information is to be transferred to the bus, read a bus grant indication, and cause the information to either be stored in the buffer if the bus grant information does not indicate that transfer of the information from the device to the bus is allowed, or be transferred from the device to the bus if the buffer is empty and the bus grant indication indicates that transfer of the information to the bus is allowed.

Yet another aspect is a buffer bypass circuit for reducing latency in information transfers to a bus that is included in a computer system. The computer system includes the bus with access governed by a bus arbiter employing a bus parking scheme, and a buffer having inputs coupled to a device so that information to be transferred from the device to the bus is stored in the buffer if a grant indication generated by the bus arbiter indicates that the bus is unavailable for the transfer.

The buffer bypass circuit in this case comprises: a multiplexer having first inputs coupled to inputs to the buffer, second inputs coupled to outputs of the buffer, outputs coupled to the bus, and at least one select input for selectively coupling either the first or the second inputs to the outputs; and logic configured to provide control information to the at least one select input such that the first inputs are coupled to the outputs of the multiplexer if the buffer is empty and the grant indication indicates that the bus is available for transfer of the information to the bus.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
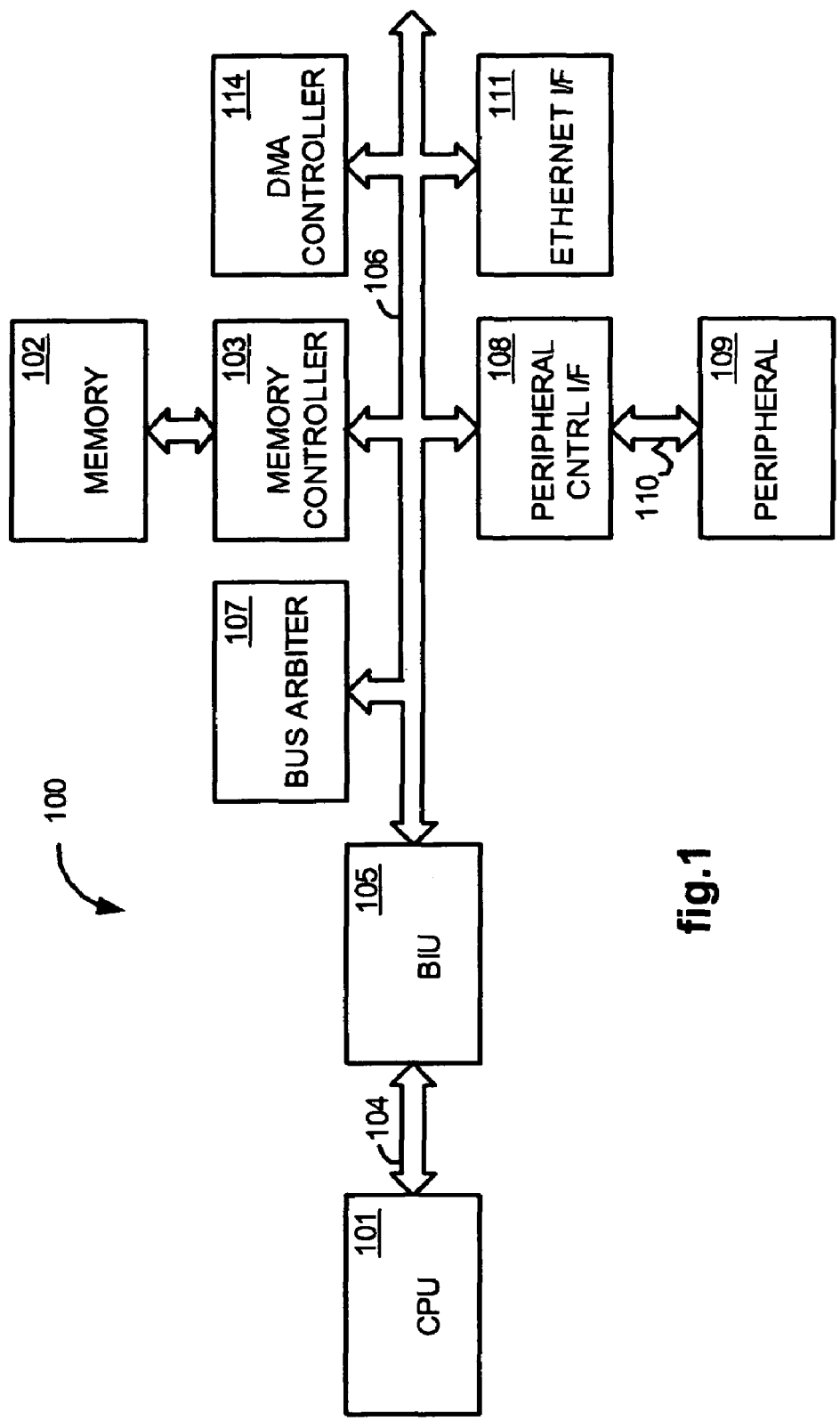
FIG. 1 illustrates a block diagram of a computer system utilizing aspects of the present invention.

FIG. 1 illustrates, as an example, a block diagram of a Computer System 100. A Bus 106 serves as main communication artery for various devices or components in the Computer System 100 to communicate with one another through information transfers. Among these devices are a Central Processing Unit (CPU) 101, a Memory Controller 103 managing access to a Memory 102, a Peripheral Controller Interface (I/F) 108 managing and facilitating communications 110 with a Peripheral 109, an Ethernet I/F 111 managing and facilitating communications with other devices on a local area or other network, and a Direct Memory Access (DMA) Controller 114.

Since only one device may use the Bus 106 at a time, a Bus Arbiter 107 is included in the Computer System 100 to manage access to the Bus 106 by arbitrating between competing requests issued by different devices. Although the CPU 101 must compete for access to the Bus 106 just like each of the other devices in the Computer System 100, it is given some preferential treatment through a bus parking scheme employed by the Bus Arbiter 107. Using this scheme, each time the Bus 106 becomes idle, the CPU 101 is granted access to the Bus 106 even though it may not have requested it at the time. This "bus parking" grant remains active until another device requests access to the Bus 106, and that request is either granted or pending when the CPU 101 is not using the Bus 106. Thus, the CPU 101 saves the time normally spent to request access to the Bus 106 whenever the bus 106 is idle.

The CPU 101 is coupled to the Bus 106 through a Bus Interface Unit (BIU) 105. The BIU 105 serves as a bus bridge function between the Bus 106 and a CPU Bus 104 for any necessary protocol translation and/or timing synchronization activities, as well as performing latency reduction activities related to transferring information to and/or from the Bus 106 such as information buffering, pre-request/pre-grant processing, and buffer bypassing functions.

Figure 3:
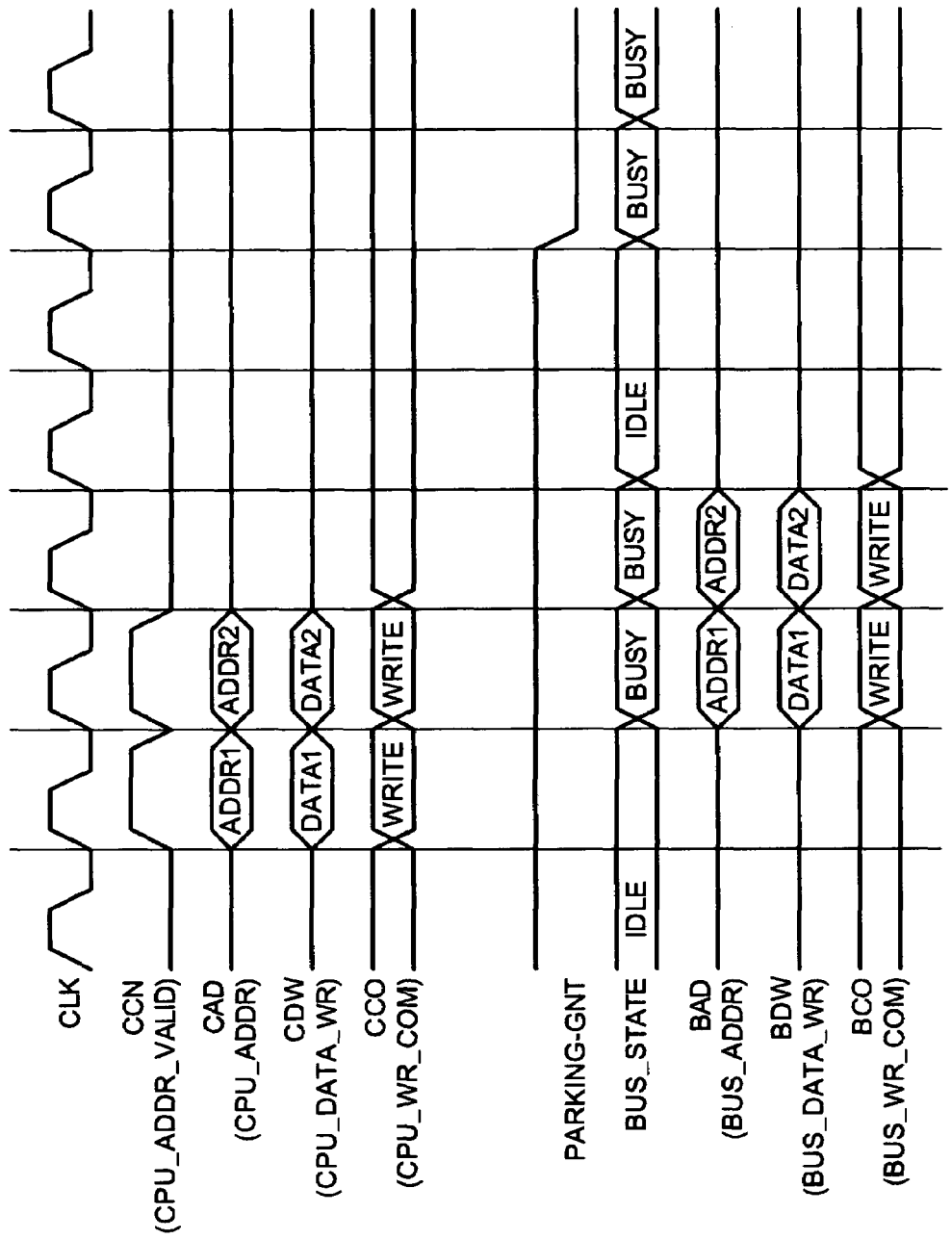
FIGS. 3 and 4 respectively illustrate timing diagrams for write and read operations using the bus interface unit of FIG. 2.
Figure 4:
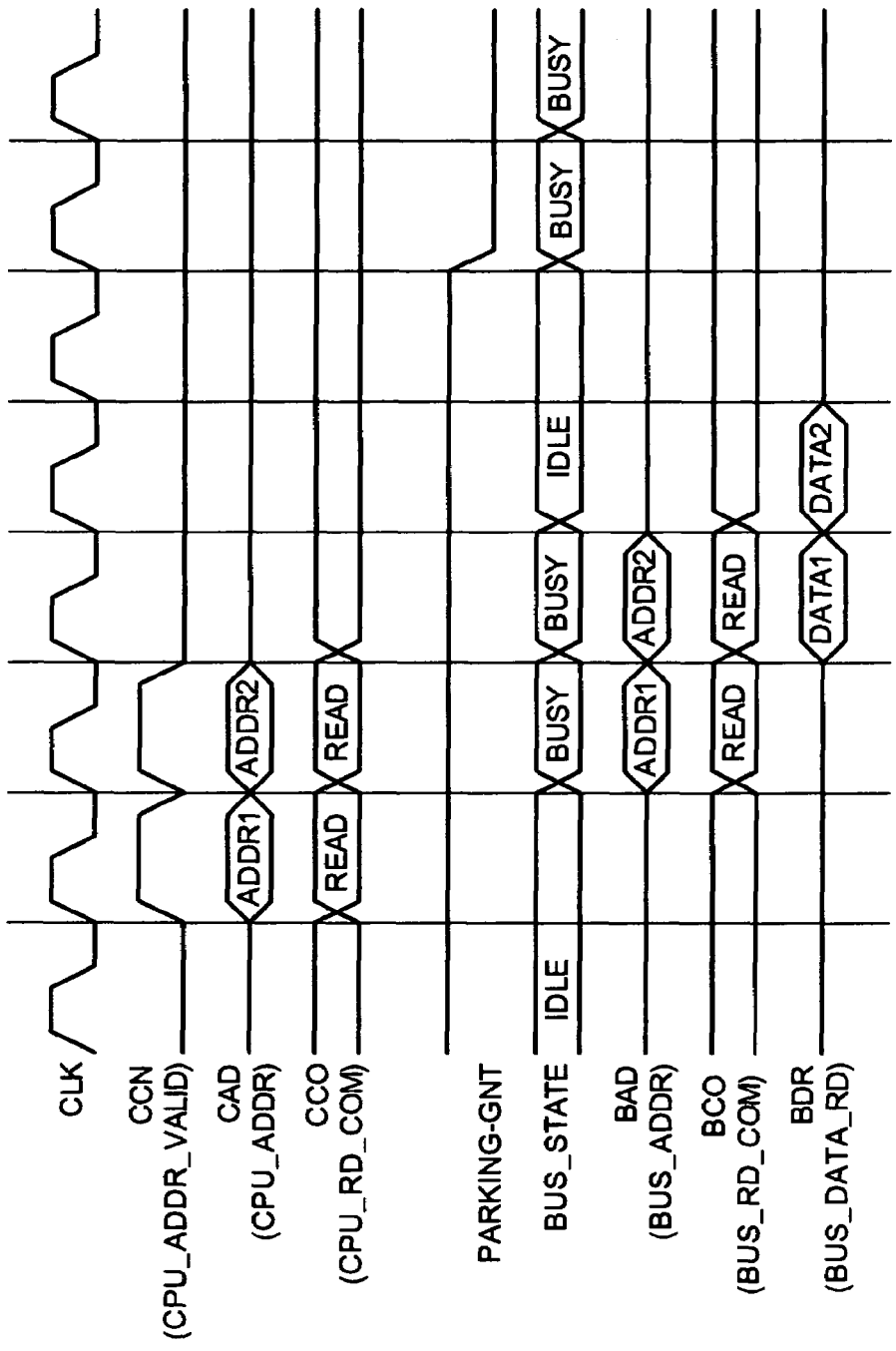

Each of the activities performed by the BIU 105 is performed in conventional BIU systems, except for the buffer bypassing function which is an aspect of the present invention. To appreciate the benefits of the buffer bypassing function, FIGS. 2~4 are provided to illustrate the implementation and operation of a prior art BIU without the buffer bypassing function, and FIGS. 5~8 illustrate the implementation and operation of the BIU 105 including a buffer bypassing circuit of the present invention.

Although a pre-request and pre-grant scheme is preferably performed in the BIU 105, the pre-request/pre-grant activities are not discussed in reference to the following figures so as not to overly complicate the timing diagrams included therein. As should be readily appreciated, however, the buffer bypassing function of the present invention is fully compatible with, and its benefits complementary to, conventional pre-request/pre-grant schemes.

Figure 2:
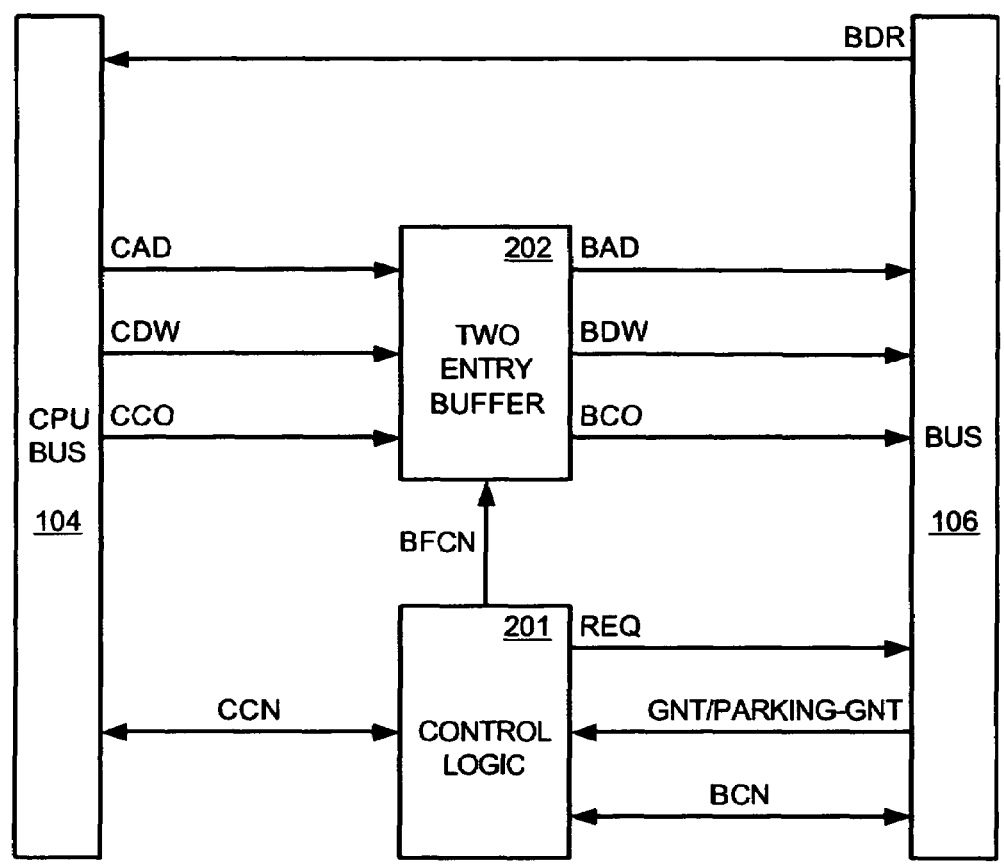
FIG. 2 illustrates a block diagram of a prior art bus interface unit.

Referring now to FIG. 2, a Two-Entry Buffer 202 is provided to store two successive words of information that are to be transferred from the CPU 101 to the Bus 106. The advantage of having the first entry to the Buffer 202 is so that the CPU 101 doesn't have to wait for the Bus 106 to become available if it is busy at the time that the CPU 101 initiates a transfer of information to the Bus 106. With the assistance of Control Logic 201, the CPU 101 can write information to be transferred to the Bus 106 into the Buffer 202 regardless of whether the Bus 106 is busy or not, and the Control Logic 201 manages subsequent transfer of the written information from the Buffer 202 to the Bus 106 when the Bus 106 is available.

The advantage of having the second entry is so that the CPU 101 can perform at least a two word burst write to the Buffer 202 in cooperation with the Control Logic 201. In particular, if the Bus 106 is unavailable at the time, then the CPU 101 can perform a two word burst write to the Buffer 202. On the other hand, if the Bus 106 is available, then the CPU 101 can perform a burst write of more words of information to the Buffer 202 by continuing to write information into it while the written information is being concurrently transferred out to the Bus 106 by the Control Logic 201 with a one clock cycle offset between the writing in and transferring out of each word of information.

As can be readily appreciated, deeper (i.e., more than two entries) and wider (i.e., more than one word per entry) buffers may also be used in practicing the present invention with appropriate modifications to the operation and/or configuration of a buffer interface unit including the buffer.

The Control Logic 201 manages the writing of information into and out of the Buffer 202 through appropriate control signals (BFCN) to the Buffer 202. Writing to the Buffer 202 is initiated after receiving an indication from the CPU 101 that information is to be transferred to the Bus 106. Examples of such an indication are a write command (CPU_WR_COM) included in command information (CCO) if data is to be transferred to the Bus 106 (i.e., CDW), and a read command (CPU_RD_COM) included in the command information (CCO) if data is to be received from the Bus 106 (i.e., BDR).

Transfer of information from the Buffer 202 to the Bus 106 is initiated by the Control Logic 201 after receiving a grant indication on a grant line (GNT/PARKING-GNT). Since the Arbiter 107 employs a bus parking scheme for the benefit of the CPU 101, the Control Logic 201 checks to see if a parking grant (PARKING-GNT) is active on the grant line. This is done in the clock cycle that follows the first writing of information to the Buffer 202. If the PARKING-GNT is active (i.e., the CPU 101 is granted access to the Bus 106), then the Control Logic 201 starts transferring information from the Buffer 202 to the Bus 106 during the same clock cycle during which it checks the grant line.

An example of a prior art two word write operation from the CPU 101 to the Bus 106 is illustrated in FIG. 3. In a first clock cycle, the state (BUS_STATE) of the Bus 106 is idle. Therefore, the parking grant (PARKING-GNT) to the CPU 101 is active (defined in this case as being logic HIGH). In a second clock cycle, the CPU 101 initiates a transfer of information by providing an address (ADDR1) for a first word of the information on parallel address lines (CAD), data (DATA1) to be written to that address on parallel data lines (CDW), and appropriate commands for the first word such as a write command (WRITE) on parallel command lines (CCO). The Control Logic 201 then causes these three items comprising the first word to be written into the first entry of the Buffer 202 by providing an appropriate command output on one or more control lines (BFCN) to the Buffer 202.

In a third clock cycle, the CPU 101 provides the address (ADDR2) for a second word of the information to be transferred on parallel address lines (CAD), data (DATA2) to be written to that address on parallel data lines (CDW), and appropriate commands for the second word such as a write command (WRITE) on parallel command lines (CCO). The Control Logic 201 then causes these three items comprising the second word to be written into the second entry of the Buffer 202 by providing an appropriate control output on the one or more control lines (BFCN) to the Buffer 202.

Concurrently in the third clock cycle, the Control Logic 201 also determines that the parking grant (PARKING-GNT) is still active, and causes the Buffer 202 to provide the address (ADDR1) for the first word of information to be transferred on parallel address lines (BAD), corresponding data (DATA1) for the first word on parallel data lines (BDW), and appropriate commands for the first word such as a write command (WRITE) on parallel command lines (BCO) of the Bus 106 from the first entry in the Buffer 202. Since the Bus 106 is being used by the CPU 101 at this time, its state is changed from the idle state (IDLE) to a busy state (BUSY).

Note that although the Control Logic 201 could have determined in the second clock cycle whether the parking grant (PARKING-GNT) to the CPU 101 was still active, there is little advantage in doing so in that clock cycle, because the first word of the information would not be available at that time for transfer out of the Buffer 202.

In a fourth clock cycle, there are no more words of information to be transferred from the CPU 101, but there is still the second word to transfer from the Buffer 202 to the Bus 106. Therefore, the Control Logic 201 causes the Buffer 202 to provide the address (ADDR2) for the second word on parallel address (BAD), data (DATA2) for the second word on parallel data lines (BDW), and appropriate commands for the second word such as a write command (WRITE) on parallel command lines (BCO) of the Bus 106 from the second entry in the Buffer 202.

Since the information transfer is now completed, the Control Logic 201 informs the Arbiter 107 that it is freeing the Bus 106 so that the bus state (BUS_STATE) goes back to its idle state (IDLE), and remains there until a seventh clock cycle when another device is granted access to and starts using the Bus 106, thereby placing its bus state (BUS_STATE) in its busy state (BUSY). Although not shown, when this device is subsequently finished with the Bus 106, the Arbitrator 107 will either grant the Bus 106 to a winning one of any pending bus requests at the time or automatically grant it to the CPU 101 if the Bus 106 is idle at the time.

An example of a prior art two word read operation is illustrated in FIG. 4. In a first clock cycle, the state (BUS_STATE) of the Bus 106 is idle, and the parking grant (PARKING-GNT) to the CPU 101 is active. In a second clock cycle, the CPU 101 initiates a transfer of information by providing an address (ADDR1) for a first word of the information to be transferred on parallel address lines (CAD), and appropriate commands for the first word such as a read command (READ) on parallel command lines (CCO). The Control Logic 201 then causes these two items comprising the first word to be written into the first entry of the Buffer 202 by providing an appropriate control output on one or more control lines (BFCN) to the Buffer 202.

In a third clock cycle, the CPU 101 provides the address (ADDR2) for a second word of the information to be transferred on parallel address lines (CAD), and appropriate commands for the second word such as a write command (WRITE) on parallel command lines (CCO). The Control Logic 201 then causes these two items comprising the second word to be written into the second entry of the Buffer 202 by providing an appropriate control output on the one or more control lines (BFCN) to the Buffer 202.

Concurrently in the third clock cycle, the Control Logic 201 also determines that the parking grant (PARKING-GNT) to the CPU 101 is active, so it causes the Buffer 202 to provide the address (ADDR1) for the first word of information on parallel address (BAD), and appropriate commands for the first word such as a read command (READ) on parallel command lines (BCO) of the Bus 106 from the first entry in the Buffer 202.

In a fourth clock cycle, there are no more words of information to be transferred from the CPU 101, but there is still the second word of information to transfer from the Buffer 202 to the Bus 106. Therefore, the Control Logic 201 causes the Buffer 202 to provide the address (ADDR2) for the second word on parallel address lines (BAD), and appropriate commands for the second word such as a read command (READ) on parallel command lines (BCO) of the Bus 106 from the second entry in the Buffer 202.

Also in the fourth clock cycle, data (DATA1) corresponding to the first word of information is read from the address (ADDR1) transferred to the Bus 106 in the previous (i.e., third) clock cycle, and provided on parallel data lines (BDR) of the Bus 106. This information is not passed through a buffer, because the CPU 101 has been prior notified by the Control Logic 201 through control lines (CCN) that the data is coming so the CPU 101 is prepared to accept it. Likewise, in a fifth clock cycle, data (DATA2) corresponding to the second word of information is read from the address (ADDR2) transferred to the Bus 106 in the previous (i.e., fourth) clock cycle, and provided to the CPU 101 on the parallel data lines (BDR) of the Bus 106.

Since the information transfer is now completed, the Control Logic 201 informs the Arbiter 107 that it is freeing the Bus 106 so that the bus state (BUS_STATE) goes back to its idle state (IDLE), and remains there until a seventh clock cycle when another device is granted access to and starts using the Bus 106, thereby placing its bus state (BUS_STATE) into a busy state (BUSY).

Figure 5:
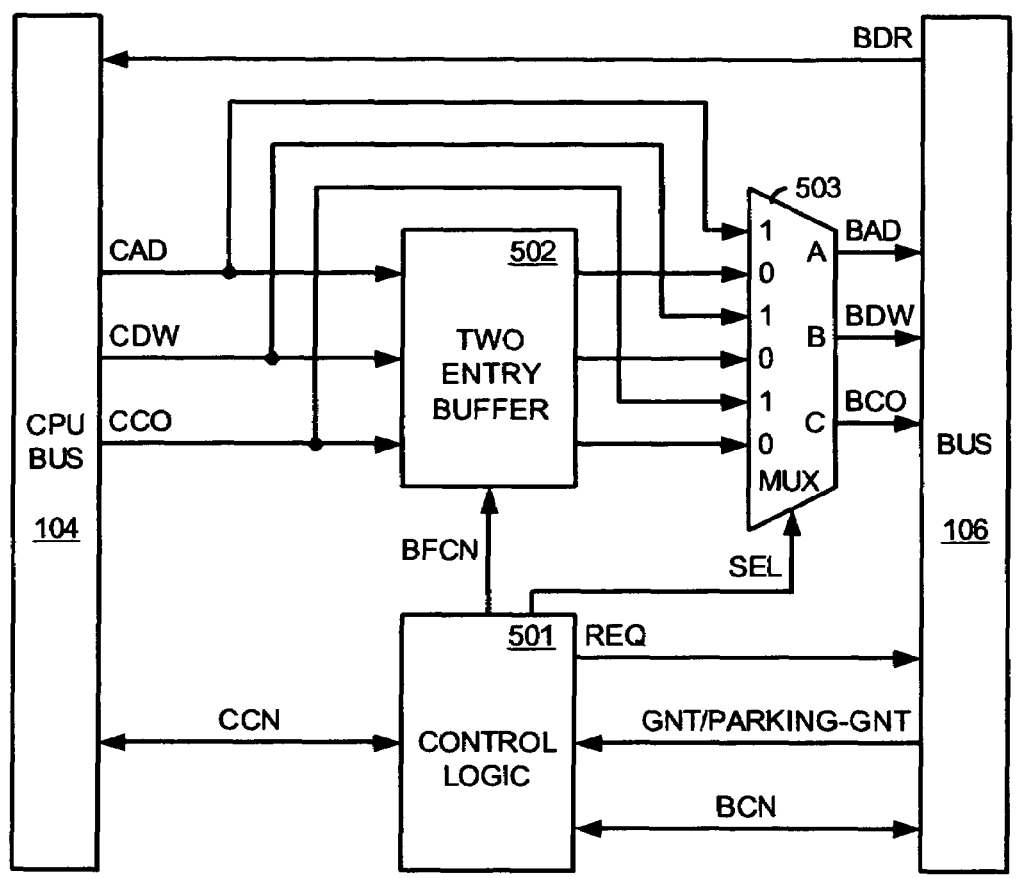
FIG. 5 illustrates a block diagram of a bus interface unit including a buffer bypass circuit utilizing aspects of the present invention.
Figure 6:
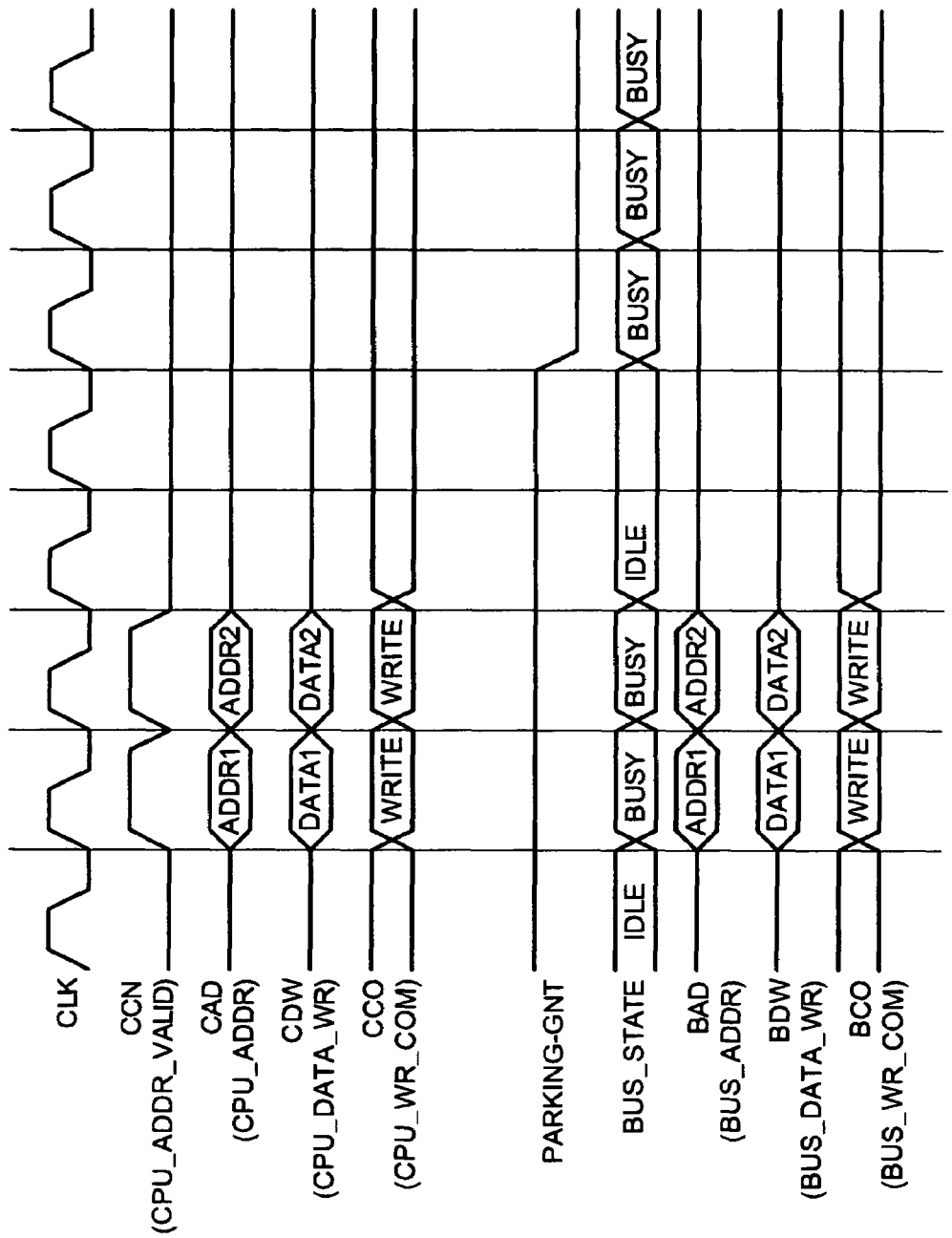
FIGS. 6 and 7 illustrates timing diagrams for write and read operations using the bus interface unit of FIG. 5 utilizing aspects of the present invention.
Figure 7:
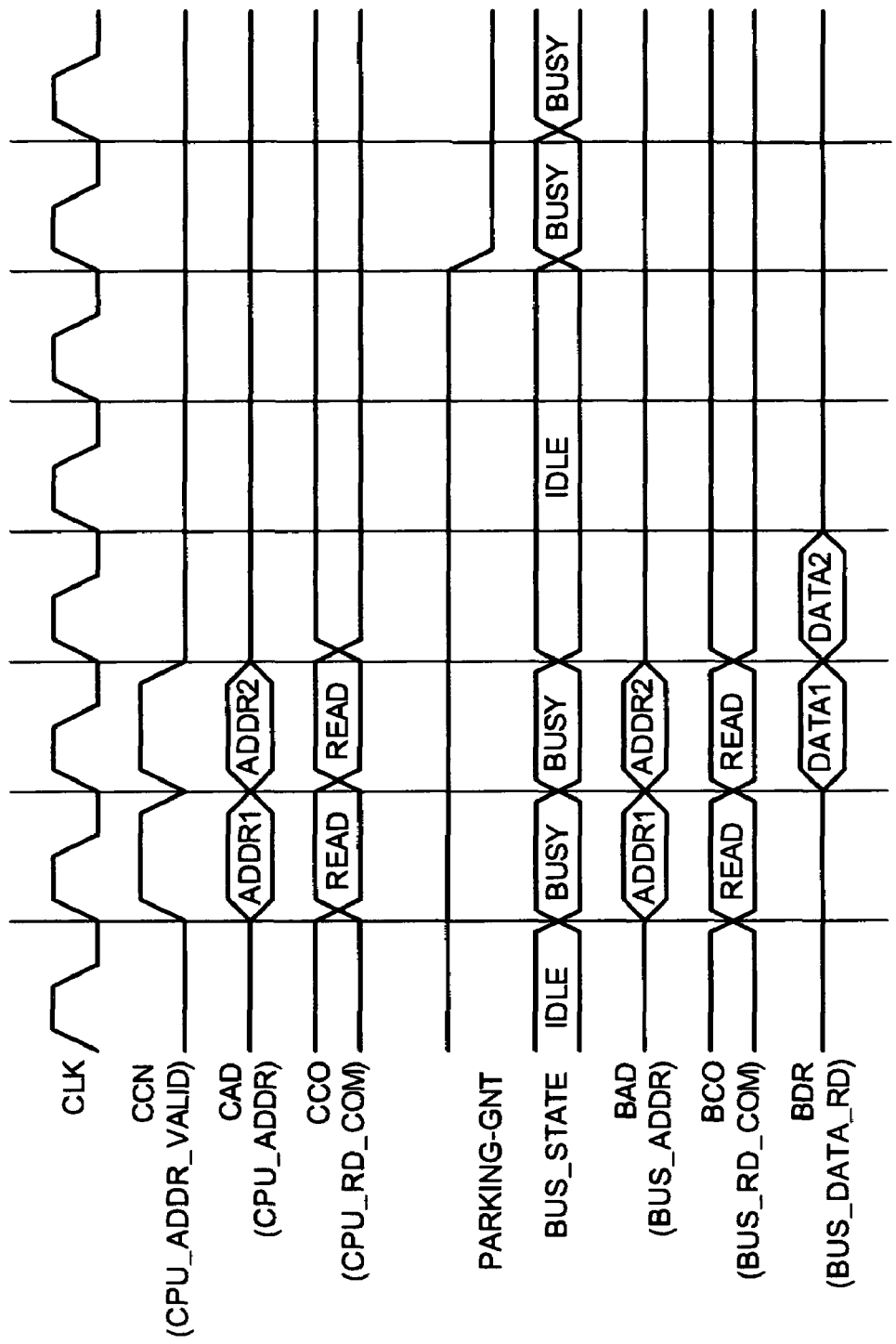

FIG. 5 illustrates, as an example, the addition of a Buffer Bypass Circuit to the system of FIG. 2 that reduces latency in information transfers to the Bus 106. In particular, by comparing the timing diagrams of FIG. 3 corresponding to the system of FIG. 2 to its counterpart FIG. 6 corresponding to the system of FIG. 5 with the added Buffer Bypass Circuit, a two word write operation from the CPU 101 to the Bus 106 is performed in one less clock cycle using the system of FIG. 5. Similarly, by comparing the timing diagrams of FIG. 4 corresponding to the system of FIG. 2 to its counterpart FIG. 7 corresponding to the system of FIG. 5 with the added Buffer Bypass Circuit, a two word read operation is also performed in one less clock cycle using the system of FIG. 5. Note that in FIGS. 5~7, the status of the grant line (GNT/PARKING-GNT) is checked in the same clock cycle that the Control Logic 501 receives an indication from the CPU 101 that information is to be transferred to the Bus 106, because the information in this case is immediately available for transfer from the CPU Bus 104 to the Bus 106 at that time.

The Buffer Bypass Circuit comprises a Multiplexer (MUX) 503 and an enhanced Control Logic 501. The MUX 503 allows selective bypassing of a Buffer 502 which otherwise operates and serves the same purpose as the Buffer 202 in FIG. 2. The enhanced Control Logic 501, on the other hand, not only performs all of the functions described in reference to the Control Logic 201 in FIG. 2, but it also generates a control output provided to a select input (SEL) of the Multiplexer 503 in accordance with the flow diagram of a method illustrated in FIG. 8.

The Multiplexer 503 has a first set of inputs (designated by a "1") that are coupled to inputs of the Buffer 502, and a second set of inputs (designated by a "0") that are coupled to outputs of the Buffer 502. When the select input (SEL) to the MUX 503 is in a logic state of "1", then the MUX 503 couples the first set of inputs to its outputs A, B and C so that an input word to the Buffer 501 is provided on the outputs. On the other hand, when the select input (SEL) to the MUX 503 is in a logic state of "0", then the MUX 503 couples the second set of inputs to its outputs A, B and C so that a word stored in the Buffer is provided on the outputs. In this second case, the circuit of FIG. 5 operates identically as the circuit described in reference to FIG. 2. In the first case, the circuit of FIG. 5 bypasses the Buffer 502 so that it is effectively eliminated from the operation of the circuit.

Figure 8:
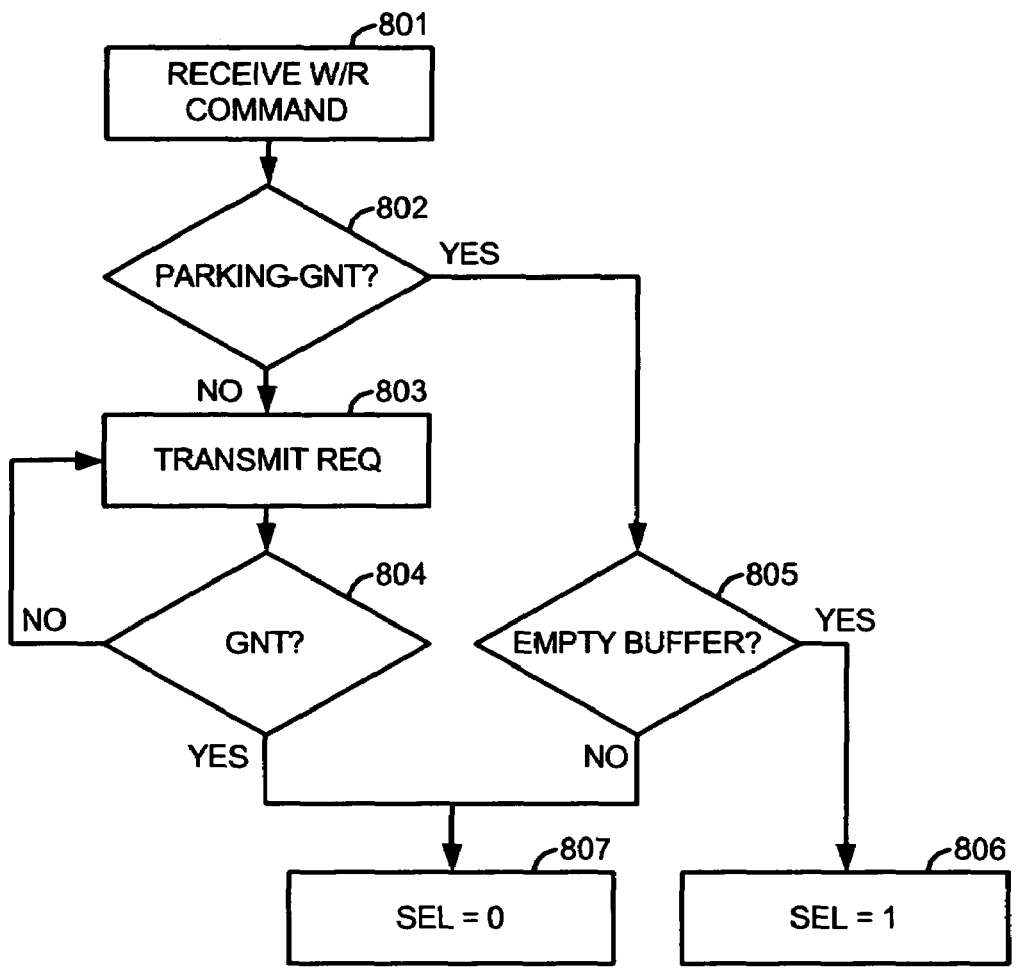
FIG. 8 illustrates a flow diagram of a method employed in the buffer bypass circuit for reducing latency in information transfers to a bus, utilizing aspects of the present invention.

Referring to FIG. 8, in 801, the Control Logic 501 receives an indication from the CPU 101 that information is to be transferred from the CPU 101 to the Bus 106. During the same clock cycle, in 802, the Control Logic 501 then reads a bus grant indication provided on the grant line (GNT/PARKING-GNT). In particular, if the Arbiter 107 employs a bus parking scheme, the Control Logic 501 checks to see at this point if a parking grant to the CPU 101 is active.

If the grant indication does not indicate that transfer of the information to the bus is allowed at that time (e.g., the parking grant to the CPU 101 is not active), then in 803, the Control Logic 501 issues a request to access the Bus 106 on a request line (REQ) coupled directly to the Arbiter 107, and in 804~803, periodically continues to request such access until access is granted. The request may be issued in the same clock cycle at 801 or a subsequent clock cycle. Meanwhile during this time, the Control Logic 501 is also causing the information to be stored in the Buffer 502 in the same manner as described in reference to FIG. 2. After receiving the grant (or before receiving the grant, but after determining that the parking grant to the CPU 101 was not active), the Control Logic 501 generates a control output which is provided to the select input (SEL) of the MUX 503 so that the select input (SEL) is in a logic state of "0".

On the other hand, if the grant indication checked in 802 indicates that transfer of the information to the bus is allowed (e.g., a parking grant to the CPU 101 is active), then 805~807 are performed in the same clock cycle as 801. In 805, the Control Logic 501 checks to see if the Buffer 502 is empty at the time. If the Buffer 502 is empty, then in 806, the Control Logic 501 generates a control output which is provided to the select input (SEL) of the MUX 503 so that the select input (SEL) is in a logic state of "1". This effectively causes the Buffer 502 to be bypassed so that information transfers are performed directly from the CPU 101 to the Bus 106 and consequently, one clock cycle is saved by passing the Buffer 502. On the other hand, if the Buffer 502 is not empty, then in 807, the Control Logic 501 generates a control output which is provided to the select input (SEL) of the MUX 503 so that the select input (SEL) is in a logic state of "0". In this case, the system of FIG. 5 operates in generally the same manner as the system of FIG. 2, with no saving of a clock cycle.

In the examples illustrated in FIGS. 3~4 and 6~7, it is assumed that the Bus 106 is in its idle state when the CPU 101 initiates a transfer of information to the Bus 106. In practice, this assumption may seldom occur if the Bus 106 is heavily utilized. Therefore, a frequently occurring case may be the Control Logic 201 finding the parking grant (PARKING-GNT) not active. In this case, the Control Logic 201 will issue a request (REQ) to the Arbiter 107 to access the Bus 106 while the first word of the information to be transferred is written into the first entry of the Buffer 202. Consequently, in such a situation, there is little advantage in bypassing the buffer for subsequent word transfers to the Bus 106.

However, if the Bus 106 is found to be in its idle state (IDLE) when the CPU 101 initiates a transfer of information to the Bus 106, then latency in the transfer of information can be reduced by one clock cycle by passing the Buffer 202 and causing the CPU 101 to transfer the information directly to the Bus 106. Even if the Bus 106 is found to be in its idle state only one out of every ten times when the CPU 101 initiates a transfer of information to the Bus 106, that means bypassing the Buffer 202 each of those times results in saving one clock cycle every ten transfers of information from the CPU 101 to the Bus 106. Such an increment to system performance is clearly worthwhile to implement in a high performance computer system.

Although the various aspects of the present invention have been described with respect to a preferred embodiment, it will be understood that the invention is entitled to full protection within the full scope of the appended claims.

We claim:

1. A method for reducing latency in information transfers to a bus, comprising:
   receiving an indication that information is to be transferred from a device to a bus in a first clock cycle and reading a bus grant indication in the first clock cycle;
   writing the information to a buffer if the bus grant indication does not indicate that transfer of the information to the bus is allowed; and
   bypassing the buffer and transferring the information to the bus if the buffer is empty and the bus grant indication indicates that transfer of the information to the bus is allowed.

2. The method according to claim 1, wherein the information includes a write command, an address, and data to be written to the address.

3. The method according to claim 2, wherein the indication that information is to be transferred to the bus includes the write command.

4. The method according to claim 1, wherein the information includes a read command and an address from which data is to be read.

5. The method according to claim 4, wherein the indication that information is to be transferred to the bus includes the read command.

6. The method according to claim 1, wherein access to the bus is controlled by a bus arbiter employing a bus parking protocol.

7. The method according to claim 6, further comprising sending a bus access request to the bus arbiter if the bus grant indication does not indicate that transfer of the information to the bus is allowed.

8. The method according to claim 7, further comprising periodically sending bus access requests to the bus arbiter and reading the bus grant indication if the information stored in the buffer has not been transferred to the bus, so that when the bus grant indication indicates that transfer of the information to the bus is allowed, the information stored in the buffer is transferred to the bus.

9. A bus interface unit for reducing latency in information transfers from a device to a bus, comprising:
   a buffer having inputs coupled to the device; and
   logic configured to receive an indication from the device in a first clock cycle that information is to be transferred to the bus, read a bus grant indication in the first clock cycle, and cause the information to either be stored in the buffer if the bus grant information does not indicate that transfer of the information from the device to the bus is allowed, or be transferred from the device to the bus, thereby bypassing the buffer, if the buffer is empty and the bus grant indication indicates that transfer of the information to the bus is allowed.

10. The bus interface unit according to claim 9, wherein the information includes a write command, an address, and data to be written to the address.

11. The bus interface unit according to claim 10, wherein the indication from the device that information is to be transferred to the bus includes the write command.

12. The bus interface unit according to claim 9, wherein the information includes a read command and an address from which data is to be read.

13. The bus interface unit according to claim 12, wherein the indication from the device that information is to be transferred to the bus includes the read command.

14. The bus interface unit according to claim 9, wherein access to the bus is controlled by a bus arbiter employing a bus parking protocol.

15. The bus interface unit according to claim 14, wherein the logic is further configured to send a bus access request to the bus arbiter if the bus grant indication does not indicate that transfer of the information to the bus is allowed.

16. The bus interface unit according to claim 15 wherein the logic is further configured to periodically send bus access requests to the bus arbiter and read the bus grant indication if the information stored in the buffer has not been transferred to the bus, so that when the bus grant indication indicates that transfer of the information to the bus is allowed, the logic causes the information stored in the buffer to be transferred to the bus.

17. The bus interface unit according to claim 9, wherein the logic includes a multiplexer having first inputs coupled to the buffer inputs, second inputs coupled to the buffer outputs, outputs coupled to the bus, and at least one select input for selectively coupling either the first or the second inputs to the outputs; and the logic is further configured to provide a control output to the at least one select input so that the first inputs are coupled to the outputs if the bus grant indication indicates that transfer of the information to the bus is allowed and the buffer is empty.

18. The bus interface unit according to claim 17, wherein the logic is further configured to provide the control output to the at least one select input so that the second inputs are coupled to the outputs if the bus grant indication does not indicate that transfer of the information to the bus is allowed.

19. In a computer system including a bus with access governed by a bus arbiter employing a bus parking scheme and a buffer having inputs coupled to a device so that information to be transferred from the device to the bus is stored in the buffer if a bus grant indication generated by the bus arbiter indicates that the bus is unavailable for the transfer, a buffer bypass circuit for reducing latency in information transfers to the bus comprising:

a multiplexer having first inputs coupled to inputs to the buffer, second inputs coupled to outputs of the buffer, outputs coupled to the bus, and at least one select input for selectively coupling either the first or the second inputs to the outputs; and logic configured to receive an indication from the device in a first clock cycle that information is to be transferred to the bus, read a bus grant indication in the first clock cycle, and provide control information to the at least one select input such that the first inputs are coupled to the outputs of the multiplexer if the buffer is empty and the bus grant indication indicates that the bus is available for transfer of the information to the bus.

20. The buffer bypass circuit claimed in claim 19, wherein the logic is further configured to provide control information to the at least one select input generated such that after checking the bus grant indication the second inputs are coupled to the outputs of the multiplexer if the buffer is not empty and the bus grant indication indicates that the bus is available for transfer of the information to the bus, or the bus grant indication does not indicate that the bus is available for transfer of the information to the bus.

21. The buffer bypass circuit according to claim 19, wherein the information includes a write command, an address, and data to be written to the address.

22. The buffer bypass circuit according to claim 19, wherein the information includes a read command and an address from which data is to be read.

23. The buffer bypass circuit according to claim 19, wherein the logic is further configured to send a bus access request to the bus arbiter if the bus grant indication does not indicate that the bus is available for transfer of the information to the bus.

24. The buffer bypass circuit according to claim 23, wherein the logic is further configured to periodically send bus access requests to the bus arbiter and read the ensuing bus grant indications generated by the arbiter in response to the bus access requests if the information stored in the buffer has not been transferred to the bus, so that when one of the bus grants grant indications indicates that the bus is available for transfer of the information to the bus, the information stored in the buffer is transferred to the bus.

* * * * *

UNITED STATES PATENT AND TRADEMARK OFFICE
CERTIFICATE OF CORRECTION

PATENT NO. : 7,296,109 B1
APPLICATION NO. : 10/767001
DATED : November 13, 2007
INVENTOR(S) : Zhang et al.

It is certified that error appears in the above-identified patent and that said Letters Patent is hereby corrected as shown below:

Column 1, line 54 the word "passing" should read --bypassing--.

Column 7, line 45 the word "passing" should read --bypassing--.

Column 8, line 1 the word "passing" should read --bypassing--.

Signed and Sealed this

Fifteenth Day of July, 2008

JON W. DUDAS
*Director of the United States Patent and Trademark Office*